United States Patent Office 2,913,471
Patented Nov. 17, 1959

2,913,471

PREPARATION OF TETRAORGANOSILANES BY PYROLYSIS OF ALKYLSILSESQUIOXANES

Philip D. George, Schenectady, and Paul D. Zemany, Scotia, N.Y., assignors to General Electric Company, a corporation of New York No Drawing. Application April 18, 1956
Serial No. 578,901

6 Claims. (Cl. 260—448.2)

This invention relates to the pyrolysis of polymeric organosiliconic acids. Still more particularly, this invention relates to the preparation of tetraorganosilanes by the pyrolysis of organosiliconic acids. The terms "organosiliconic acids" and "organosilsesquioxanes" are used interchangeably and refer to polymers of the formula $(RSiO_{1.5})_n$, where R is a monovalent hydrocarbon radical.

In the accepted commercial method for the production of organosilanes, reaction is generally effected between silicon and organohalides to form organosilicon compounds which contain organo and halogen atoms attached to silicon. By these commercial methods of preparation, tetraorganosilanes are rarely, if ever, formed. During the commercial process, less desirable trifunctional silanes, such as methyltrichlorosilanes, are formed along with the more desirable difunctional silanes, such as dimethyldichlorosilanes. Since these trifunctional silanes are less desirable commercially than difunctional silanes, it is desirous to convert them to compounds of greater commercial importance, such as tetraorganosilanes. These are more desirable because they are more readily redistributed with $SiCl_4$ or $RSiCl_3$, to the more valuable $R_2SiCl_2$ compounds.

It has long been known that trifunctional organosilanes hydrolyze to form polymeric materials. Thus, when compounds of the formula $RSiX_3$ are hydrolyzed, a compound $RSi(OH)_3$ (which has been termed an organosiliconic acid) is theroretically formed. Because a single organic group exerts little retarding influence on the condensation of the triol, siliconic acid immediately splits out water and forms polymeric materials of the formula $(RSiO_{1.5})_n$ having a three-dimensional silicon and oxygen network. These polymeric compositions are known as organosiliconic acids or organosilsesquioxanes. In the above formula R is selected from the group consisting of alkyl, e.g. methyl, ethyl, propyl, butyl, octyl, etc.; alkenyl, e.g. vinyl, allyl, etc.; cycloalkyl, e.g. cyclopentyl, cyclohexenyl, etc.; cycloalkenyl, e.g. cyclohexenyl, etc.; aryl, e.g. phenyl, tolyl, xylyl, naphthyl, etc.; aralkyl, e.g. benzyl, phenethyl, etc.; halogenated aryl, e.g. chlorophenyl, di-bromophenyl, fluorophenyl, etc.; alkinyl, e.g. ethinyl, etc. and the like. X is any group capable of being readily hydrolyzed to an —OH group, for example, halogen, e.g. chlorine, bromine, etc.; alkoxy, e.g. methoxy, ethoxy, propoxy, butoxy, etc.

These siliconic acids have been described in Meads and Kipping, "Journal Chem. Soc.," 107, 459–468; in Rochow, "Chemistry of the Silicones," 2nd ed., 1951, published by John Wiley and Sons, p. 54; in Iler, "The Colloidal Chemistry of Silica and Silicates," Cornell University Press (1955), p. 169; in U.S. Patents 2,441,422 and 2,441,423, Kriebel and Elliott; in Barry et al., JACS, 77, 4248 (1955); in U.S. Patent 2,465,188, Barry et al. By reference, these publications are incorporated into the present specification.

In U.S. Patent 2,465,188, Barry et al., and the above Barry et al. JACS reference, there is described the preparation of distillable organosilsesquioxanes of the formula $(RSiO_{1.5})_n$ wherein the average degree of polymerization represented by $n$ is a whole number from 8 to 24, inclusive. These low molecular weight organosilsesquioxane polymers are prepared by heating high molecular weight organosilsesquioxane polymers to a temperature of from 200–500° C. and at a pressure of less than 5 mm. in the presence of an alkali metal hydroxide catalyst. Thus, the process described is essentially a distillation of a low molecular weight organosilsesquioxane which are contained in the original product or which are formed by fragmentation of a high molecular weight organosilsesquioxane to one of a more distillable lower molecular weight.

Unexpectedly, we have now discovered that when organosilsesquioxanes are pyrolyzed at 250–600° C., preferably 300–400° C., at atmospheric, at superatmospheric, or at mild reduced pressure, such as above 100 mm. pressure, i.e. under such conditions that the originally fragmented organosilsesquioxanes are kept in the high temperature zone to be further rearranged, one obtains tetraorganosilanes, such as tetramethylsilane. Below 250° C. no appreciable reaction takes place. This reaction occurs with both organosilsesquioxanes and the alkali metal salts thereof. Thus, for example, when methylsilsesquioxanes and the alkali metal salts thereof are heated at about 300–400° C. at atmospheric pressure, the gaseous product emanating from the reaction mixture contains high percentages of tetramethylsilane. In contrast to the Barry et al. reaction which is essentially fragmentation of a high polymer to a lower polymer, this process effects a redistribution of the organo groups around the silicon atom.

The significance of this discovery is that less desirable silanes, i.e. methyltrichlorosilanes can be converted to more desirable silanes, for example, tetramethylsilane.

Since more side reactions occur above 400° C., the preferred temperature range is 300–400° C. In order to reduce oxidative effects, the reaction is carried out in the absence of air. Since the products of the reactions are vaporous gases, it is desirable to conduct the reaction under such conditions so as to preclude the loss of these vapors and gases.

In order that those skilled in the art may better understand how the present invention may be practiced, the following examples are given by way of illustration and not by way of limitation. All parts are by weight unless otherwise stated.

In general, the siliconic acids are prepared by the hydrolysis of an organosilane containing three hydrolyzable groups, such as methyltrichlorosilane, ethyltriethoxysilane, etc. and the subsequent solution of the hydrolysis product in an aqueous or aqueous alcoholic solution of an alkali metal hydroxide, such as NaOH, KOH, etc. in the ratio of at least one mole of alkali hydroxide per mole of silicon, thereby to form a solution comprising an alkali-metal salt of the siliconic acid. These alkali-metal salts can be pyrolyzed, as such in this process, or these salts can be treated with an acid or an acid salt which will liberate the siliconic acid in colloidal form. These colloids can be converted to gels, washed free of salts and thereafter dried. Methods of preparing these compositions are described in the references cited above.

*Example 1*

A high molecular weight methylsiliconic acid is placed in a quartz tube. The air is kept out of contact with the reactants by using a slow stream of nitrogen. The methylsiliconic acid is heated in a furnace to 300–400° C. At this temperature, the gaseous products emanating from the reaction mixture contain a high percentage of tetramethylsilane. The product is collected in a liquid nitrogen trap. The products of this reaction analyzed in a mass spectrometer indicate that in addition to tetramethylsilane (the main product) some hexamethyldisiloxane, hexamethylcyclotrisiloxane and small amounts of methane, CO and $CO_2$ are also formed.

Example 2

The procedure of Example 1 is repeated except that the sodium siliconate is substiuted for the siliconic acid of Example 1. Products similar to those of Example 1 were obtained.

Example 3

In addition to running the reaction at atmospheric pressure, superatmospheric pressure can also be used. Thus, when a high molecular weight methylsiliconic acid is placed in an autoclave and heated to 300–400° C. for several hours, an autogenic rise in pressure is noted. The autoclave is then cooled and vented through a liquid nitrogen trap. Identification of the product in a mass spectrometer shows the product to be chiefly tetramethylsilane.

Although the present invention has been specifically described in conjunction with methylsiliconic acids, the process is also applicable to organosiliconic acids containing organic groups other than methyl; for example, the other organopolysiloxanes described above; for example, corresponding alkyl siliconic acid are prepared from ethyl trichlorosilane, propyl trichlorosilane, and butyl trichlorosilane, etc. These siliconic acids on pyrolysis yield the corresponding tetraalkylsilanes.

The tetraorganosilanes such as tetramethylsilane can be used as dielectric media in gas-filled electrical equipment, such as transformers, cables and the like. In addition, they can be used as intermediates useful in the preparation of the more valuable $R_2SiCl_2$ compounds by distribution with $SiCl_4$ or $RSiCl_3$ by the usual methods known to the art, such as in the presence of $AlCl_3$, etc.

Although this invention has been described in relation to organosiliconic acids of the formula $(RSiO_{1.5})_n$, compounds which are substantially of this formula but contain some uncondensed silanol groups can also be used.

What we claim as new and desire to secure by Letters Patent of the United States is:

1. A process of preparing tetraalkylsilanes which comprises pyrolysing at a temperature of 250–600° C. a member selected from the group consisting of alkylsilsesquioxanes and the alkali metal salt thereof at a pressure of greater than 100 mm., said alkyl group being a lower alkyl radical.
2. The process of claim 1 wherein the reaction is carried out at 300–400° C.
3. The process of claim 1 wherein the lower alkyl radical is the methyl radical.
4. The process of claim 2 wherein the lower alkyl radical is the methyl radical.
5. The process of claim 1 where the reaction is carried out under superatmospheric pressure.
6. The process of claim 1 where the alkali metal salt is pyrolysed.

References Cited in the file of this patent

Rochow et al.: "J. Am. Chem. Soc.," vol. 63 (1941), p. 798–800.

Barry et al.; ibid, 77 (1955), p. 4248–4252.

Andrianov et al.: "Khimicheskaya Promyshlennost" (Chemical Industry, Moscow, U.S.S.R., vol. 6, p. 329–335, 1955).